United States Patent
Duncan et al.

(10) Patent No.: US 7,925,556 B1
(45) Date of Patent: Apr. 12, 2011

(54) STREAMING CONVERSION

(75) Inventors: Randall L. Duncan, Blue Springs, MO (US); Kenneth L. Oxler, Lenexa, KS (US); Stephen D. Whipple, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1310 days.

(21) Appl. No.: 10/781,377

(22) Filed: Feb. 18, 2004

(51) Int. Cl.
G06Q 40/00 (2006.01)

(52) U.S. Cl. .................................... 705/35; 705/28

(58) Field of Classification Search ............ 705/40, 705/35
See application file for complete search history.

(56) References Cited

U.S. PATENT DOCUMENTS 5,650,994 A * 7/1997 Daley .......................... 370/259
6,529,909 B1 * 3/2003 Bowman-Amuah ............ 707/10
6,970,915 B1 * 11/2005 Partovi et al. ................ 709/217

OTHER PUBLICATIONS

Mimno P.R. "How to select an extraction/transformation/loading tool"; Federal Computer Week Jul. 2, 2001 vol. 15 ISS21 p. S11.*

* cited by examiner

Primary Examiner — Ella Colbert
Assistant Examiner — John A Anderson

(57) ABSTRACT

A system for streaming conversion of data from a first system to a second system. The system comprises an extractor component, a translator component, and a loader component. The extractor component is operable to extract a unit of data from the first system. The translator component is operable to convert the unit of data from a first data format compatible with the first system to a second data format compatible with the second system. The loader component is operable to load the unit of data converted to the second data format into the second system, the extractor, the translator, and loader components operable for conversion of the unit of data during normal operation of the first and second systems.

24 Claims, 3 Drawing Sheets

STREAMING CONVERSION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the conversion of customer data from one billing system to another. More particularly, embodiments of the present invention provide for the continuous streaming conversion of an active data store of customer billing data.

BACKGROUND OF THE INVENTION

Corporations and other enterprises that use automated billing systems to send bills to their clients might have a need to discontinue the use of one billing system and begin use of another billing system. The conversion from a legacy billing system to a new billing system can be a complicated process. For example, conversion from the legacy system to the new system may require that customer billing data be converted from the format of the legacy system into the format of the new system.

The conversion of customer data from one billing system to another has traditionally been done through a batch process in which several million conversions might be done in a relatively short period of time. A batch conversion of this size can require as many as 30 to 40 hours to complete. Access to the data stores holding the customer data is typically denied during the conversion process so that the data does not change during the process. If a customer requests access to billing data during the outage, it might not be possible to fulfill the request. Outages of this size are typically scheduled for weekends and other non-standard work hours to minimize their impact. This can require that in-house information technology personnel work overtime or that temporary personnel be hired. The support of outside contractors experienced in batch conversion processes may also be needed, creating an additional expense.

SUMMARY OF THE INVENTION

An embodiment of the invention is a system for streaming conversion of data from a first system to a second system. The system comprises an extractor component, a translator component, and a loader component. The extractor component is operable to extract a unit of data from the first system. The translator component is operable to convert the unit of data from a first data format compatible with the first system to a second data format compatible with the second system. The loader component is operable to load the unit of data converted to the second data format into the second system, the extractor, the translator, and loader components operable for conversion of the unit of data during normal operation of the first and second systems.

An alternative embodiment is a method of streaming conversion of data from a first system to a second system. The method comprises extracting a unit of data from a database associated with the first system, translating the unit of data from a first format accessible by the first system to a second format accessible by the second system, loading the translated unit of data into a database associated with the second system, and normally operating and accessing data from the first and second systems during the extraction, translating and loading of the unit of data.

Another alternative embodiment is a system for streaming conversion of data. The method comprises a first system having data in a first format, a second system having data in a second format, a data warehouse in communication with the first and second systems and operable to store portions of data from the first and second systems, an auditing system operable to monitor changes to data in the first and second systems, a enterprise system maintaining standards related to data in the first and second systems, an extractor component operable to extract a unit a of data from the first system, a translator component operable to convert the unit of data from the first format compatible with the first system to the second format compatible with the second system, a loader component operable to load the unit of data converted to the second format into the second system, the extractor, the translator, and loader components operable for conversion of the unit of data during operation of the first and second systems, a audit component operable to notify the audit system regarding the conversion of the unit of data, and a warehouse component operable to notify the data warehouse regarding the conversion of the unit of data to the second system.

DETAILED DESCRIPTION OF THE PREFERRED EMBODIMENTS

Customer billing data can be converted from one billing system to another through a streaming process rather than a batch process. Streaming conversion allows a store of customer data to be converted from a legacy billing system to a new billing system with minimal system and customer outages. In an embodiment, the conversion process extracts relevant source data from the legacy system, transforms the data into target data compatible with the new system, and inserts the data into the new system, all in real time. That is, data is converted through a continuous streaming process in which small numbers of customer accounts are converted over long periods of time, as opposed to batch processes in which large numbers of accounts are converted over relatively shorter periods of time.

In an embodiment, the steps of extraction of data from the legacy billing system, translation of data from the legacy format to the new format, and loading of data into the new billing system are performed as separate processes. Rather than running sequentially as in a batch process, the steps are performed in parallel with a master controller overseeing them. This allows extraction, translation, and loading for different accounts to occur simultaneously, thus improving overall streaming system performance.

The unit of work for streaming conversion is a single billing account. Compared with the data set managed by batch conversion, the smaller set of data managed at any one time by streaming conversion creates a smaller demand on computing systems. The computing load is spread out over a longer period compared to batch conversion and system spikes are prevented. Through the use of a continuous streaming process in which one work unit at a time is converted over a period of less than one minute each, the need for outages is eliminated and the chances of a customer requesting billing information while the conversion is in progress are reduced.

In an embodiment, an application that can be referred to as a conversion engine is responsible for initiating and carrying out the conversion of a given account and for maintaining multiple concurrent conversion processes. The conversion engine can run as a production application beside already existing production applications. Through methods such as IBM's MQSeries, FTP, and direct SQL, the conversion engine can interface with several systems within an enterprise to obtain and deliver data and provide notification of a conversion event. The conversion engine also stores information about errors, schedules, status, and audits in a local data store.

Figure 1:
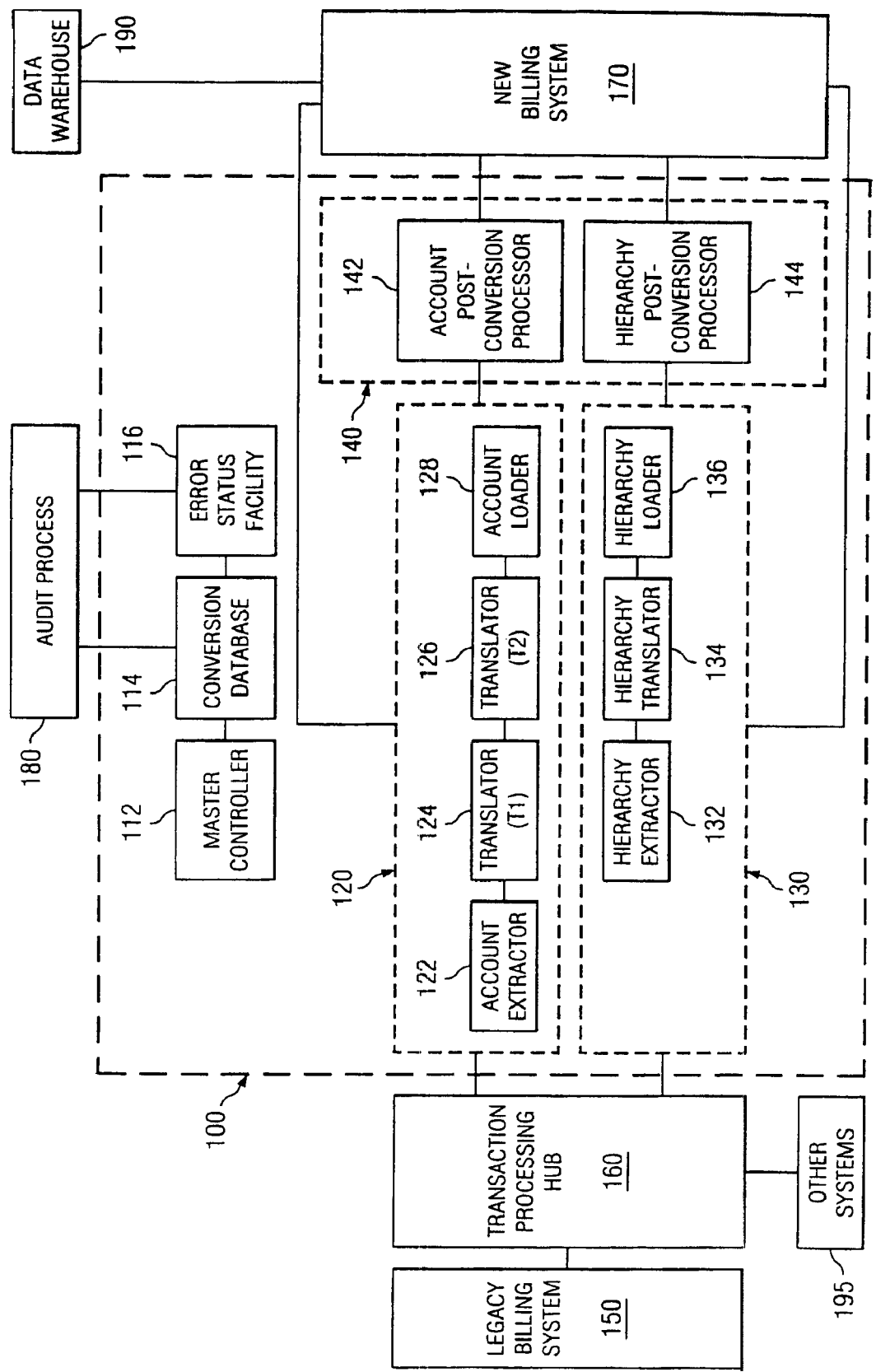
FIG. 1 is a block diagram of a customer billing data conversion engine.

An embodiment of a conversion engine is depicted in FIG. 1 along with several processes and systems with which the conversion engine might interact. Components of the conversion engine 100 include a master controller 112, a conversion database 114, an error status facility 116, an account conversion process 120, a hierarchy conversion process 130, and a post-conversion process 140.

The master controller 112 initiates work into the conversion process, oversees the conversion steps, and handles errors. The master controller 112 also oversees communications among the components of the conversion engine 100. This can include system level requests, system level errors, and general component communication.

The conversion database 114 maintains various tables such as a schedule table that records when accounts are to be converted. The conversion database 114 also maintains records of errors in the conversion process and a history of the status of accounts as they pass through the conversion process. Examples of typical statuses are provided below.

The error status facility 116 receives reports from the other components in the conversion engine 100 regarding errors that occur in the components.

Components of the account conversion process 120 include an account extractor 122, a T1 translator 124, a T2 translator 126, and an account loader 128. Components of the hierarchy conversion process 130 include a hierarchy extractor 132, a hierarchy translator 134, and a hierarchy loader 136. Components of the post-conversion process 140 include an account post-conversion processor 142 and a hierarchy post-conversion processor 144.

Other processes and systems with which the conversion engine 100 might interact include a legacy billing system 150, a transaction processing hub 160, a new billing system 170, an audit process 180, a data warehouse 190, and other systems 195.

The master controller 112 is the coordinator of the entire conversion process. When the conversion engine 100 is started, the master controller 112 is also started. The master controller 112 searches the schedule table in the conversion database 114 for accounts that are eligible for conversion. Upon finding an eligible account, the master controller 112 spawns other processes in the conversion engine 100 based on need and workload.

The criteria for eligibility might include that the account be in a "Scheduled" status, that the current time be later than the conversion begin date, and that the current time be earlier than the conversion end date. The order in which accounts are converted can be based first on priority and then on the conversion begin date. The master controller 112 pulls eligible accounts from the schedule table in the conversion database 114 and moves accounts through the conversion engine 100.

The master controller 112 is responsible for limiting the number of work units that start the conversion process based on the hour of the day, the day of the week, or the day of the year. By limiting the number of conversions that are started, the master controller 112 limits how quickly conversions occur. The master controller 112 watches the flow of work units and adjusts it to prevent logjams. Each work unit is tracked through the process for errors, system impacts, and rate of conversion.

When the master controller 112 is restarted after a shutdown, it checks the status of the accounts in the schedule table in the conversion database 114. If the master controller 112 finds accounts in an abnormal state, it assumes an abnormal shutdown of the conversion engine 100 occurred. It resets the status of the accounts in order to allow them to process normally.

Another function of the master controller 112 is the turning on and off of a feature known as data point blocking. Modification of the content of billing data is typically not desirable while conversion of the format of the data is in progress. To prevent such changes, access can temporarily be blocked to processes or services that have the capability of modifying billing data. This blocking of access to data during the conversion process can be referred to as data point blocking. For a telecommunications company, examples of services for which data point blocking may be implemented include swapping of mobile phone numbers, addition or removal of subscribers on an account, plan changes, equipment orders, payments on an account, and password modifications. When the conversion of an account is complete, data point blocking can be removed and services such as these can again be accessed. Viewing of account information is typically allowed even when data point blocking is in place.

The master controller 112 interfaces with the conversion database 114. The conversion database 114 contains a table that acts as a scheduler for when accounts are eligible for conversion. The account schedule is determined by the eligible dates (conversion begin date and conversion end date) and by the priority of the account. An account is typically not scheduled for conversion between the start date of a cycle and the time the cycle has been released by a finance group.

The determination of which files to convert can be based on parameters such as functionality in the new billing system 170 and the types of customer accounts. After selection of an account for conversion has taken place, a file containing the accounts selected is given to a conversion team to load into the schedule table. The schedule table can be loaded through an SQL load script that says which accounts are to be converted. Account list files can be loaded either on demand or at regular intervals. If an account is already in the schedule table, the process updates the account with the information in the file. Accounts are not updated if they are in the conversion process.

A record of changes to the schedule table is maintained. Each update to the schedule table has the previous row written to a status history table. This creates a historical record of all the changes that have occurred to an account in the process of its conversion.

Another table in the conversion database 114 stores the status of accounts in the conversion process. Other tables in the conversion database 114 store information such as a list of errors that occurred in the conversion process and when they occurred, translation information to allow conversion between data formats, and reference information to ensure data integrity.

The use of the conversion database 114 allows database activities such as these to be kept separate from the conversion processes 120 and 130. Thus, the performance of the conversion engine 100 is not affected by any slowdowns that might occur in the database activities.

The error status facility 116 can be considered the administrator of the conversion engine 100. Information about the processing of an account is returned to the master controller 112 by each component in the conversion engine 100. As the components communicate with the master controller 112, they send copies of the messages to the error status facility 116. The error status facility 116 extracts any error and status information from the messages and stores the information in the conversion database 114.

In the case of an error in the conversion process, the master controller 112 turns off data point blocking for the extractor components 122 and 132 and the translator components 124, 126, and 134. The account does not pass to the next step in the workflow. In addition, the error status facility 116 changes the account status to "Failed" and records all errors found by each component.

If the master controller 112 encounters a system level error such as an MQSeries failure or a database error, it attempts to shut down the conversion engine. If the master controller detects that a component has terminated unexpectedly, it logs the fact that the component had the problem and attempts to shut down the conversion engine 100.

In an embodiment, two types of conversion of billing data take place concurrently, account conversion 120 and hierarchy conversion 130. Account conversion 120 is the process of converting the billing data in a customer account from the format of the legacy billing system 150 to the format of the new billing system 170. Data that might be converted includes customer identification information such as name, address, and account number as well as account balance, billing history, and other billing information. In addition, for a telecommunications company, information such as the number of handsets owned by a customer, the telephone numbers of the handsets, and the services to which a customer subscribes might be converted.

As the first step in the account conversion process 120, the account extractor 122 turns on data point blocking. The account extractor 122 ensures that this has been done successfully before continuing. The account extractor 122 then extracts data from the legacy billing system 150, packages the data in a file, and passes it to the T1 translator 124. Multiple extraction method calls can be made in parallel. During extraction, the account extractor 122 applies basic filter logic and determines whether any accounts are not eligible for conversion.

If the account extractor 122 encounters a system level error, it alerts the master controller 112, logs the error in an internal log, and shuts itself down. If an error occurs in the extraction process, the error is logged via the error status facility 116, the account status is changed to "Failed", and a fatal error is reported.

When the account extractor 122 completes extraction of an account, it informs the master controller 112 that extraction is complete. The master controller 112 then informs the T1 translator 124 to begin work on that account and informs the account extractor 122 to begin extracting another account. In this way, the conversion engine 100 can process multiple accounts simultaneously.

Translation of data from the format of the legacy billing system 150 to the format of the new billing system 170 is performed by the T1 translator 124 and the T2 translator 126. The T1 translator 124 translates data from the legacy format to an intermediate file format. The T2 translator 126 translates data from the intermediate file format to the new format. The translators 124 and 126 can interface with local databases to look up translation logic for matching data between formats. Complex logic can be shared between the T1 translator 124 and the T2 translator 126 to translate data such as price plans.

Verification against reference data is also performed on the data to ensure its legitimacy. For example, a state abbreviation code should never be changed by the conversion process. A table of state codes (AL for Alabama, etc.) can be maintained in the conversion database 114 or in another data store local to the translators 124 and 126. When a conversion is complete, a converted state code can be compared to the reference state codes to ensure they match.

In an alternative embodiment, there is only one translator which translates data directly from the format of the legacy billing system 150 to the format of the new billing system 170 without the use of an intermediate file format.

When the translation is complete, translator T2 126 passes the converted data to the account loader 128. The account loader 128 inserts the account data into the new billing system 170, provides notification that the billing system for the account has changed, and closes the account in the legacy billing system 150. The account loader 128 uses basic SQL or a similar protocol to load data directly into the new billing system 170. The account loader 128 receives files from the T2 translator 126 in the form of tables readable by the new billing system 170. In particular, one table is equivalent to one file for the account loader 128 and one row in the file is equivalent to one row in the data store in the new billing system 170. When all of the tables have been inserted, the data is committed to the data store.

After the data is loaded, the account loader 128 sends two notifications. One notification is a redirect usage message providing notification that future usage should be routed to the new billing system 170. A billing system indicator in a cross-reference table is updated to indicate that the new billing system 170 is in use. The billing system indicator is changed via a method call made by the account loader 128 at the time it commits data to the new billing system 170. The billing system indicator is then changed based on account and subscription information that the conversion supplies as part of the call.

The second notification is a convert account message that removes data point blocking. This notification also shuts down the account in the legacy billing system 150. The shutting down of the account is accomplished via a method call made by the account loader 128 at the time it commits data to the new billing system 170.

The notification processes can be faster with streaming conversion than with batch conversion. With batch conversion, a single, large notification event occurs when the entire batch conversion is complete. This notification process can consume a large amount of time when the number of converted accounts is large. Access to applications or systems that are in the process of being notified is typically blocked to ensure that the applications or systems are aware of the appropriate location of the converted data. Long-term outages of these applications or systems can result. With streaming conversion, on the other hand, notification can occur upon each conversion of an account. This allows downstream applications and systems to be almost immediately aware of a conversion and reduces the outage time for these applications and systems.

The other type of conversion of billing data performed by the conversion engine 100 is hierarchy conversion 130. Hierarchy conversion 130 deals with complex accounts such as those for large corporations. A large company might have a hierarchical account structure where the company itself is at the head of the hierarchy, multiple departments or regions comprise the company, the departments or regions are in turn made up of sub-departments or sub-regions, and so on. Complex interrelationships might exist among the various sub-departments or sub-regions. Bills would typically be sent to entities in the middle portions of the hierarchy rather than to the company itself at the top of the hierarchy or to individuals at the bottom of the hierarchy.

A legacy billing system 150 would typically maintain information about the hierarchical billing structure of a company, the interrelationships among the entities in the hierarchy, and the entities to which bills are to be sent. The hierarchy conversion process 130 translates this information from the legacy billing system 150 to the new billing system 170. When an account with a hierarchical structure is to be converted, billing information about the account passes through the account conversion process 120 as described above. Structural information about interrelationships in the account passes through the hierarchical conversion process 130.

The hierarchy extractor 132 traverses the hierarchy tree in the legacy billing system 150 starting at the root node and determines which accounts need to receive bills. The hierarchy extractor 132 feeds those accounts into the account conversion process 120. The hierarchy extractor 132 then extracts hierarchy information from the legacy billing system 150, packages the data in a file, and passes it to the hierarchy translator 134. The hierarchy translator 134 translates the hierarchy information from the legacy format to the new format and passes the converted data to the hierarchy loader 136. The hierarchy loader 136 then loads the data into the new billing system 170.

In either the account conversion process 120 or the hierarchy conversion process 130, if an error occurs at any point prior to the loading of data into the new billing system 170, the conversion process is rolled back to the "Scheduled" status and the process begins again with the extraction step. If a failure occurs in the loading process before the data is committed to the new billing system 170, the entire transaction is rolled back, the master controller 112 turns off data point blocking, the error is logged in the error table, the data is returned to its state prior to extraction, the account is placed in the "Failed" status, and a new extract from the legacy billing system 150 takes place.

If the data has been committed to the new billing system 170 and the account loader 128 receives an error in either of the notification processes, the error is recorded in the error table and the account is placed in a status that indicates that data was loaded but a failure occurred. This prevents another extraction attempt from being made on the account and prevents post-conversion processes 140 from occurring. If an error occurs after loading and notification are complete, the conversion process reverts to the last successful step. That is, if an error occurs in post-conversion processing 140, only the failed post-conversion processing steps are repeated.

When the loading of account and hierarchy data is complete, the post-conversion processes 140 can begin. The account post-conversion processor 142 deals with data that was not converted in the account conversion process 120. In the account conversion process 120, conversion is performed only for complete billing cycles of data. If conversion occurs in the middle of a billing cycle, only the unbilled call data through the most recent complete billing cycle is converted. For example, if a customer's billing cycle runs from the first day of the month through the last day of the month, and if conversion occurs on the 15th of the month, only the unbilled call data through the end of the previous month would be converted in the account conversion process 120. Unbilled call data from the first to the 15th of the month would be handled by the account post-conversion processor 142.

The account post-conversion processor 142 converts the remaining unbilled usage information in the legacy billing system 150 and loads the converted unbilled usage data into the new billing system 170. If the method call to perform a search for remaining information is unsuccessful, an error is logged with the error status facility 116 and the status of the account is changed to indicate a post-conversion failure.

The hierarchy post-conversion processor 144 shuts down the hierarchy and all its nodes in the legacy billing system 150.

When the post-conversion processes 140 for an account are complete, the account is closed out in the legacy billing system 150. Notifications are also sent to other applications informing them that conversion was successful and that the converted data now resides in the new billing system 170. In an embodiment, the notification is first sent to the transaction processing hub 160. The transaction processing hub 160 then informs other systems 195 that the billing data can be found in the new billing system 170. The other systems 195 can then go directly to the new billing system 170 to access the data without further interaction with the transaction processing hub 160. For example, the transaction processing hub 160 might inform a system that credits payments to the proper account that the account is in the new billing system 170. This system could then go to the new billing system 170 to credit a payment to the account.

The transaction processing hub 160 can contain the billing system indicator described above that records which billing system an account resides in.

In an embodiment, the transaction processing hub 160 also acts as an interface layer between the legacy billing system 150 and the conversion engine 100. That is, all data transmitted between the legacy billing system 150 and the conversion engine 100 first passes through the transaction processing hub 160. The transaction processing hub 160 can contain application programming interfaces that allow data to be extracted from the legacy billing system 150 in real time.

In an alternative embodiment, the transaction processing hub 160 is not present and the legacy billing system 150 communicates directly with the conversion engine 100. In this embodiment, the conversion engine 100 directly notifies the other systems 195 of a completed data conversion rather than the transaction processing hub 160 performing the notification.

Other applications or processes with which the conversion engine 100 might interact include an audit process 180 and a data warehouse 190. The audit process 180 can oversee the account conversion process from a financial standpoint. For example, the audit process 180 might ensure that the balance in an account remains the same before and after conversion. Also, when an error occurs in the conversion process, the audit process 180 can investigate the cause of the error. To perform these functions, the audit process 180 can receive input from both the conversion database 114 and the error status facility 116.

The data warehouse 190 can assist in the audit process by ensuring that the data in the legacy billing system 150 does not change after conversion is complete. After an account has been converted, the account should be shut down in the legacy billing system 150 and no further modifications to the account in the legacy billing system 150 should occur. However, it is possible that back door means of access to the account may still exist that allow changes to be made either maliciously or by accident. The data warehouse 190 can receive change reports from both billing systems 150 and 170 informing it whenever modifications occur to data in one of the billing systems 150 or 170. If the data warehouse 190 receives a report that a change occurred in a closed account in the legacy billing system 150, the data warehouse 190 can initiate an investigation into the cause of the change. If the change should have been made in the new billing system 170, the data warehouse can ensure that the change is made there.

Figure 2A:
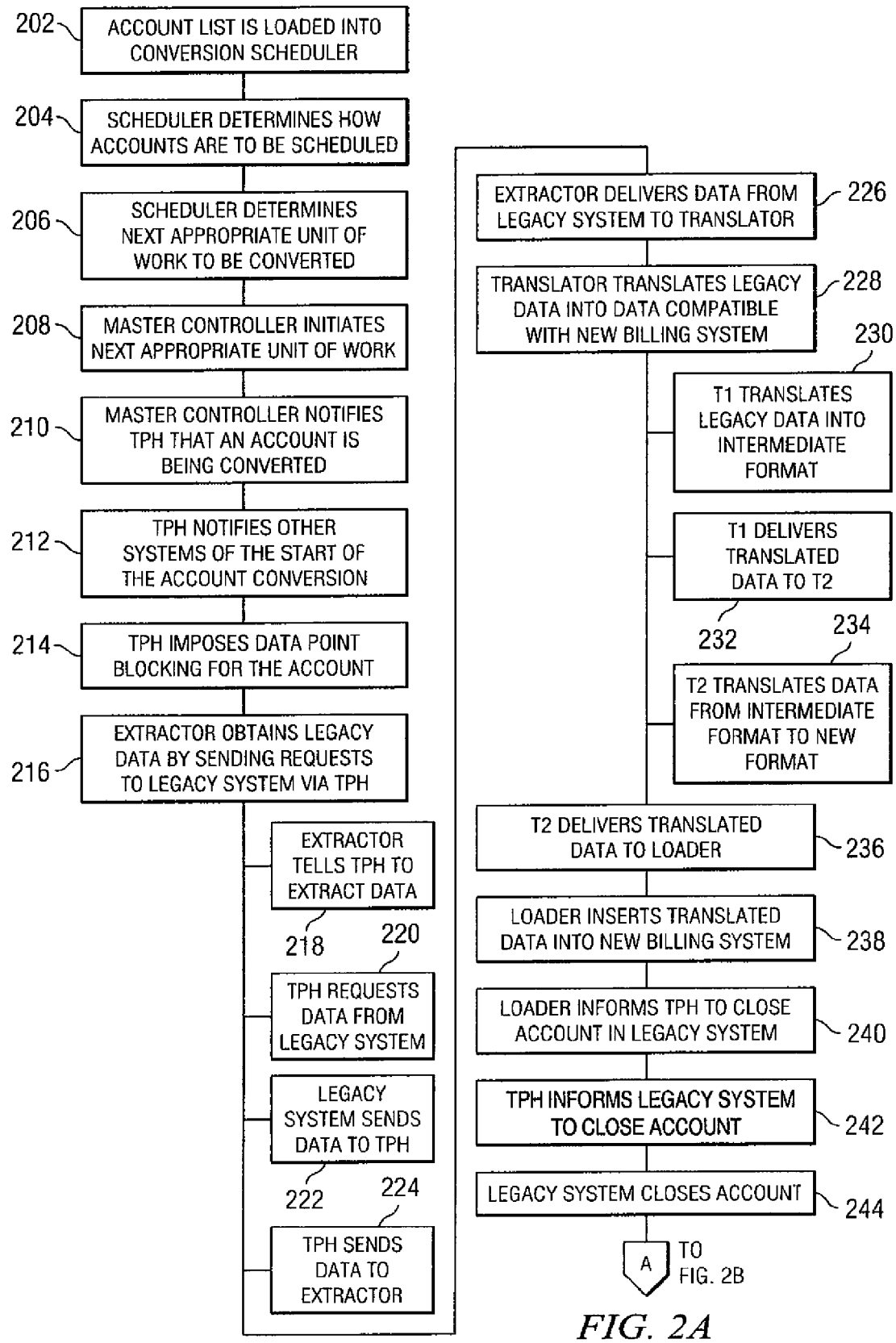
FIG. 2A is a flowchart of steps taken in a customer billing data conversion process.
Figure 2B:
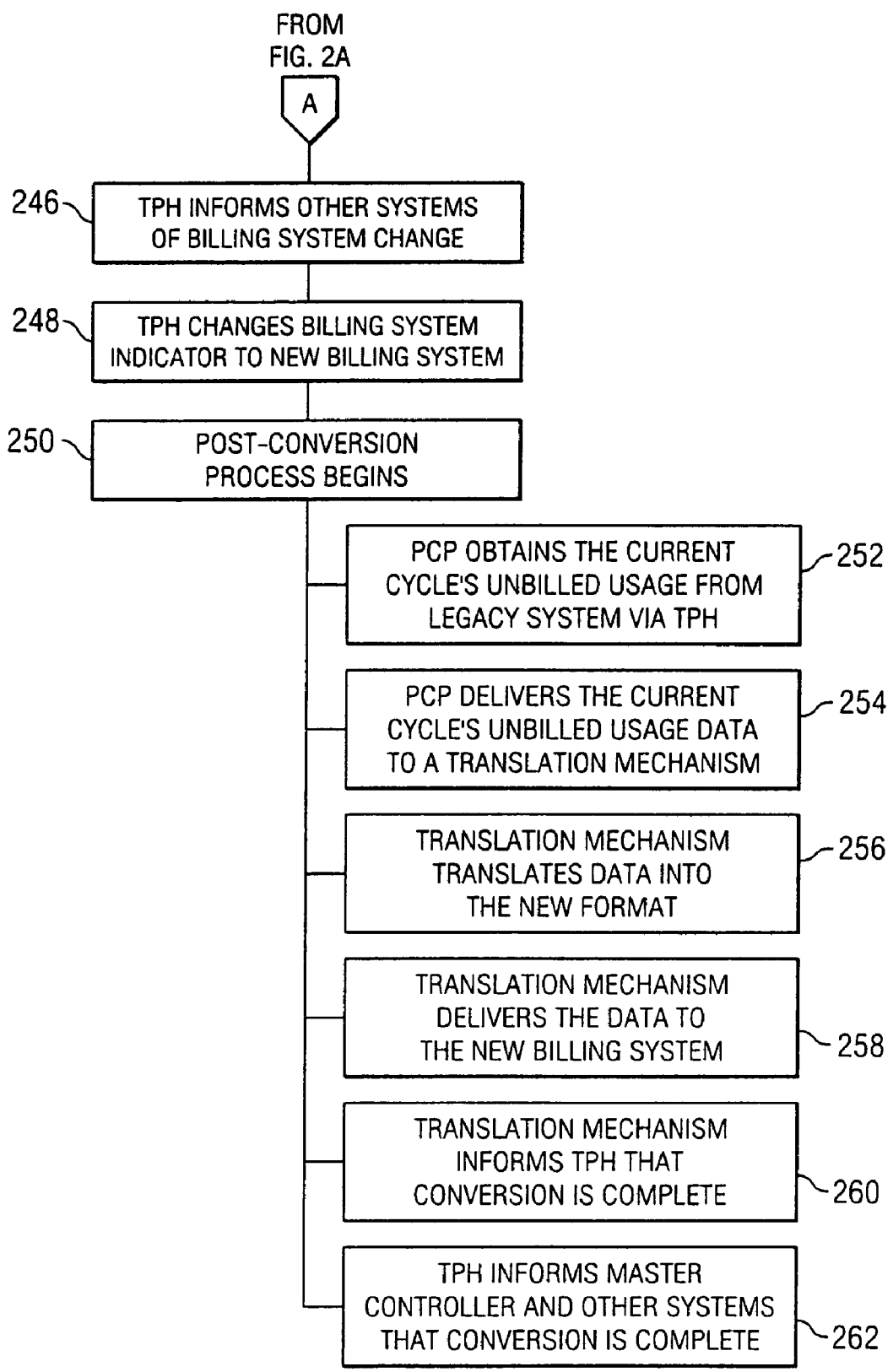
FIG. 2B is a continuation of the flowchart illustrated in FIG. 2A of the steps taken in a customer billing data conversion process.

FIG. 2 illustrates a set of steps that might be taken in the conversion of customer billing data from a legacy billing system to a new billing system by an embodiment of the streaming conversion process. In box 202, a list of accounts to be converted is loaded into a scheduler in a conversion database. In box 204, the scheduler consults a set of scheduling rules to determine how the accounts are to be scheduled. In box 206, the scheduler determines the next appropriate unit of work to be converted. A master controller initiates the next appropriate unit of work in box 208. In box 210, the master controller notifies a transaction processing hub (TPH) that an account is in the process of being converted. In box 212, the transaction processing hub notifies other systems of the start of the account conversion. The transaction processing hub imposes data point blocking for the account in box 214. In box 216, an extractor obtains data from the legacy billing system by sending requests to the legacy system via the transaction processing hub.

This extraction process consists of the steps shown in boxes 218 through 224. In box 218, the extractor tells the transaction processing hub to extract the legacy data. In box 220, the transaction processing hub requests the data from the legacy system. The legacy system sends the data to the transaction processing hub in box 222 and the transaction processing hub sends the data to the extractor in box 224. Upon receiving data from the legacy system, the extractor delivers the data to a translator in box 226. In box 228, the translator translates the legacy data into data that is in the format of the new billing system.

The translation consists of the steps shown in boxes 230 through 234. In box 230, a translator that can be referred to as T1 translates the legacy data into an intermediate file format. In box 232, T1 delivers the translated data to a translator that can be referred to as T2. In box 234, T2 translates the data from the intermediate file format into the format of the new billing system.

T2 delivers the translated data to a loader in box 236. In box 238, the loader inserts the translated data into the new billing system. In box 240, the loader informs the transaction processing hub to close the account in the legacy billing system. In box 242, the transaction processing hub informs the legacy system to close the account. The legacy system closes the account in box 244. The transaction processing hub informs other systems of the billing system change in box 246 and changes a billing system indicator to the new billing system in box 248.

A post-conversion process (PCP) begins in box 250. This process consists of the steps in boxes 252 through 262. In box 252, the post-conversion process obtains the current billing cycle's unbilled usage from the legacy system via the transaction processing hub. In box 254, the post-conversion process delivers the current cycle's unbilled usage data to a translation mechanism. In box 256, the translation mechanism translates the data into the format of the new system. In box 258, the translation mechanism delivers the translated data to the new billing system. In box 260, the translation mechanism informs the transaction processing hub that conversion is complete. The transaction processing hub informs the master controller and other systems that conversion is complete in box 262.

Examples of statuses that might be assigned to an account as it moves through the streaming conversion process include Scheduled: account is scheduled and ready to convert; Ready for Extraction: account has been read by the master controller and will be extracted when an extractor is ready; Extracting: account has been sent to the extractor; Extraction Complete: extraction has completed successfully; T1 Begun: universal translation has begun; T1 Complete: universal translation has completed successfully; T2 Begun: translation to new system has begun; T2 Complete: translation to new system has completed successfully; Loading Begun: loading into new system has begun; Loading Complete: loading into new system has completed successfully; Waiting for Post-Conversion: waiting for post-conversion processes to begin; Post-Conversion: post-conversion processes have begun; and Failed: conversion did not complete successfully.

The conversion engine can capture performance metrics for the streaming conversion process in two ways. First, each component in the engine writes a log file that records how long critical parts of the conversion took. In addition, all status changes are recorded in a status history table. This table records how long a particular account took for each step in the conversion.

The performance metrics information is stored in two ways. First, there is real-time information that is stored as the account converts. As the translation components complete, key reporting information is passed back in a success message and stored by the error/status facilitator. This is not a complete set of account information but is rather a set of key pieces of information used in auditing as identified by the enterprise. Second, a full load of all account information is loaded in a batch after hours after conversion has completed. If there is a fatal error during the conversion process, data loaded in the real-time format is overwritten when conversion of the account is attempted again. Data is not loaded in the batch format in the case of an error because the conversion is not completed in that case.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A system for streaming conversion of data from a first system to a second system, comprising:
   an extractor component that extracts a unit of data from a data store associated with the first system;
   a translator component that converts the unit of data from a first data format compatible with the first system to a second data format compatible with the second system;
   a loader component that loads the unit of data converted to the second data format into a data store associated with the second system, and the extractor, the translator, and loader components convert the unit of data during normal operation of the first and second systems, wherein the normal operation comprises operating, by a component other than the extractor component, the translator component, and the loader component, on data from the first system other than the unit of data from the first system during the conversion of the unit of data from the first data format to the second data format, and wherein the extractor, translator, and loader components extract, convert, and load generally in parallel; and a conversion database that maintains a schedule table comprising information indicating the time each of multiple units of data in the data store associated with the first system are to be converted; and a master controller that instructs the extractor component to extract the unit of data from the data store associated with the first system based on the information in the schedule table.

2. The system of claim 1, wherein the extractor component reads the unit of data from the first system to extract the data.

3. The system of claim 1, wherein the unit of data is further defined as an account having a portion of data in a first file and a portion of data in a second file, both the first and second files associated with the first system.

4. The system of claim 1, wherein the unit of data is identified in the first system as converted to the second system after the loader component loads the unit of data into the second system.

5. The system of claim 1, further comprising a hierarchy component that translates a hierarchy associated with the unit of data from the first data format to the second data format.

6. A method of streaming conversion of data from a first system to a second system, comprising:
    extracting a unit of data from a database associated with the first system;
    translating the unit of data from a first format accessible by the first system to a second format accessible by the second system;
    loading the translated unit of data into a database associated with the second system;
    normally accessing data other than the unit of data from the first and second systems, wherein normally accessing comprises at least one other system accessing data other than the unit of data during the extraction, translation, and loading of the unit of data and, wherein the extracting, translating, and loading are performed generally in parallel; and
    instructing, by a master controller, to extract the unit of data from the database associated with the first system based on a schedule table that indicates a time each of multiple units of data in the database associated with the first system are to be converted.

7. The method of claim 6, further comprising:
    extracting a second unit of data from the database associated with the first system while translating the unit of data; and
    translating the second unit of data from the first format to the second format while loading the unit of data into the database associated with the second system.

8. The method of claim 6, wherein the first and second systems are defined as billing systems.

9. The method of claim 8, wherein the first system is further defined as a legacy billing system.

10. The method of claim 6, further comprising locking the unit of data in the database associated with the first system to restrict access to the unit of data during the extracting, translating, and loading.

11. The method of claim 10, further comprising updating an auditing component regarding a status of conversion of the unit of data.

12. The method of claim 11, further comprising notifying a data warehouse that the unit of data has been converted to the second system.

13. The method of claim 6, wherein the first system is further defined as a first billing system, the second system is further defined as a second billing system, and the unit of data is at least a portion of a customer account, and wherein the method further comprises:
    extracting unbilled usage related to the customer account from the first billing system;
    updating, for other systems, the location of the customer account to the second billing system;
    posting, by one of the other systems, unbilled usage related to the customer account to the first billing system after updating the location of the customer account to the second billing system; extracting the subsequently posted unbilled usage from the first billing system; comparing the unbilled usage from the second billing system to the unbilled usage extracted from the first billing system to identify new unbilled usage related to the customer account; and
    loading the new unbilled usage to the second billing system.

14. A system for streaming conversion of data, comprising: a first system having data in a first format; a second system having data in a second format; a data warehouse in communication with the first and second systems and that stores portions of data from the first and second systems;
    an auditing system that monitors changes to data in the first and second systems;
    an enterprise system maintaining standards related to data in the first and second systems;
    an extractor component that extracts a unit of data from the first system;
    a translator component that converts the unit of data from the first format compatible with the first system to the second format compatible with the second system;
    a loader component that loads the unit of data converted to the second format into the second system, and the extractor, the translator, and the loader components extract, convert, and load the unit of data during normal operation of the first and second systems, wherein the normal operation comprises operating on a second unit of the data from the first system during the conversion of the unit of data from the first system, wherein the extractor, translator, and loader components extract, translate, and load generally in parallel, and wherein the loader component instructs the first system to close the unit of data in the first format to prevent access to the unit of data in the first format after the unit of data converted to the second format has been successfully loaded;
    an audit component that notifies the audit system regarding the conversion of the unit of data;
    a master controller that blocks access to the unit of data during the conversion process; and
    a warehouse component that notifies the data warehouse regarding the conversion of the unit of data to the second system.

15. The system of claim 14, further comprising:
    a controller that parallelizes conversion of the unit of data by directing the extractor component, the translator component, and the loader component.

16. The system of claim 15, wherein the audit component and the warehouse component are operably coupled to the controller.

17. The system of claim 15, further comprising a hierarchy component in communication with the controller and that translates hierarchy information related to the single customer.

18. The system of claim 15, wherein the controller promotes locking only a portion of data of the first system related to the unit of data such that the first system operates with the second portion of the data of the first system during the conversion of the unit of data to the second system.

19. The system of claim 18, wherein the second portion of data of the first system is further defined as the data of the first system other than the unit of data.

20. The system of claim 14, wherein the first and second systems are further defined as billing systems and wherein the unit of data is further defined as account information for a customer.

21. The system of claim 14, wherein the unit of data is further defined as account information for a single customer.

22. The system of claim 21, wherein the unit of data comprises billing history for a single customer.

23. The system of claim 14, further comprising:
a plurality of extractor components, wherein each extractor unit of the plurality of extractor components extracts separate units of data from the first system and writes the extracted units of data to a file;
a plurality of translator components, wherein each translator component of the plurality of translator components reads one of the units of data from the file and converts the unit of data from the first format compatible with the first system to the second format compatible with the second system; and a queue used by the plurality of extractors and plurality of translators that coordinates the extraction and translation of the units of data.

24. The system of claim 23, wherein the unit of data comprises billing history for a single customer.

* * * * *